United States Patent
Hassan et al.

(10) Patent No.: US 12,041,022 B1
(45) Date of Patent: Jul. 16, 2024

(54) MESSAGING MULTI-REPLY

(71) Applicant: Microsoft Technology Licensing, LLC, Redmond, WA (US)

(72) Inventors: Amer Aref Hassan, Kirkland, WA (US); Mahendra D. Sekaran, Sammamish, WA (US); Russell Andrew Penar, Highlands Ranch, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/373,608

(22) Filed: Sep. 27, 2023

(51) Int. Cl.
*H04L 51/216* (2022.01)
*G06F 3/0481* (2022.01)
*G06F 3/0482* (2013.01)
*H04L 51/04* (2022.01)
*H04L 51/043* (2022.01)

(52) U.S. Cl.
CPC .......... *H04L 51/216* (2022.05); *G06F 3/0481* (2013.01); *G06F 3/0482* (2013.01); *H04L 51/04* (2013.01); *H04L 51/043* (2013.01)

(58) Field of Classification Search
CPC ....... H04L 51/21; H04L 21/216; H04L 51/04; G06F 3/0481
See application file for complete search history.

(56) References Cited

U.S. PATENT DOCUMENTS

| | | | | |
|---|---|---|---|---|
| 10,862,840 B2 * | 12/2020 | Claux | ................ | G06F 3/04842 |
| 2007/0203985 A1 * | 8/2007 | Abernethy, Jr. | ..... | G06Q 10/107 |
| | | | | 709/206 |
| 2013/0024780 A1 * | 1/2013 | Sutedja | ................ | G06Q 10/107 |
| | | | | 715/752 |
| 2013/0097260 A1 * | 4/2013 | Lee | ......................... | H04W 4/00 |
| | | | | 709/206 |
| 2015/0095801 A1 * | 4/2015 | Kim | ..................... | G06Q 10/107 |
| | | | | 715/752 |

(Continued)

FOREIGN PATENT DOCUMENTS

| | | | |
|---|---|---|---|
| CA | 2 992 635 | * | 7/2018 |
| CN | 108153457 B | | 3/2021 |
| EP | 3 480 756 | * | 8/2019 |

*Primary Examiner* — Madhu Woolcock
(74) *Attorney, Agent, or Firm* — Schwegman Lundberg & Woessner, P.A.

(57) ABSTRACT

Disclosed in some examples are methods, systems, machine-readable mediums that provide for multiple concurrent message input elements in a messaging application to allow for saved draft messages. The improved interfaces allow a user to compose separate, respective responses to multiple incoming messages of a same messaging thread. As noted, the current messaging user interface (UI) only allows users to compose a response to a single message of a same messaging thread. In the present disclosed interface, if during composition of a "reply" to message A, and a user decides to first reply to message B, the in-process reply message is saved in a separate selectable input element. The user may edit and send the reply to message A at a later time—e.g., once they are done replying to message B. In some examples, the separate selectable input element may be positioned in the thread in a manner to indicate that it is a draft reply message and to which message it is a reply.

20 Claims, 10 Drawing Sheets

(56) References Cited

U.S. PATENT DOCUMENTS

| | | | |
|---|---|---|---|
| 2015/0350143 A1* | 12/2015 | Yang | G06F 3/0482 |
| | | | 345/173 |
| 2017/0032021 A1* | 2/2017 | Watanachote | H04L 51/52 |
| 2017/0034084 A1* | 2/2017 | Brunsen | H04L 51/046 |
| 2017/0220527 A1* | 8/2017 | DeLuca | H04L 51/04 |
| 2018/0097760 A1* | 4/2018 | Roth | H04L 51/42 |
| 2018/0130021 A1* | 5/2018 | Staats | G06F 3/0481 |
| 2022/0294800 A1 | 9/2022 | Madaan et al. | |
| 2023/0403250 A1* | 12/2023 | Hassan | H04L 51/216 |

* cited by examiner

MESSAGING MULTI-REPLY

TECHNICAL FIELD

Embodiments pertain to communication systems. Some embodiments relate to messaging communication systems.

BACKGROUND

Network-based messaging tools such as instant messaging (IM) allow users to communicate using one or more persistent asynchronous conversations between two or more users or groups of users. These conversations may be organized into threads by users. A thread, also known as a message thread, conversation thread, or chat thread is a sequence of related messages or posts within a messaging application that are grouped together to form a single ongoing conversation. Messages of a thread may pertain to a particular topic and may include a defined group of participants.

These messaging tools may be found as stand-alone communications applications or integrated into other applications such as unified communication applications. A unified communication application is a software platform that integrates various communication tools, such as messaging, voice and video calls, file sharing, and collaboration features, into a single, cohesive interface. It enables users to streamline their communication efforts by utilizing all these tools from one place, improving productivity and collaboration. Additionally, the unified communication applications may include features like presence indicators, calendar scheduling, and integrations with other productivity apps to enhance a user's communications.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Traditional messaging applications do not provide a specific way to "reply" to a particular message as new messages are simply posted to the end of the conversation. In response to this limitation, users developed a custom in which a user would copy the contents of an already posted message and paste it into the body of their message to indicate that the user's message is a reply to the already posted message. Recent communication applications have adopted this strategy and provided a "reply" functionality that automatically copies the message that the user is replying to in the message composition input element. The reply is then posted at the end of the thread.

Figure 1:
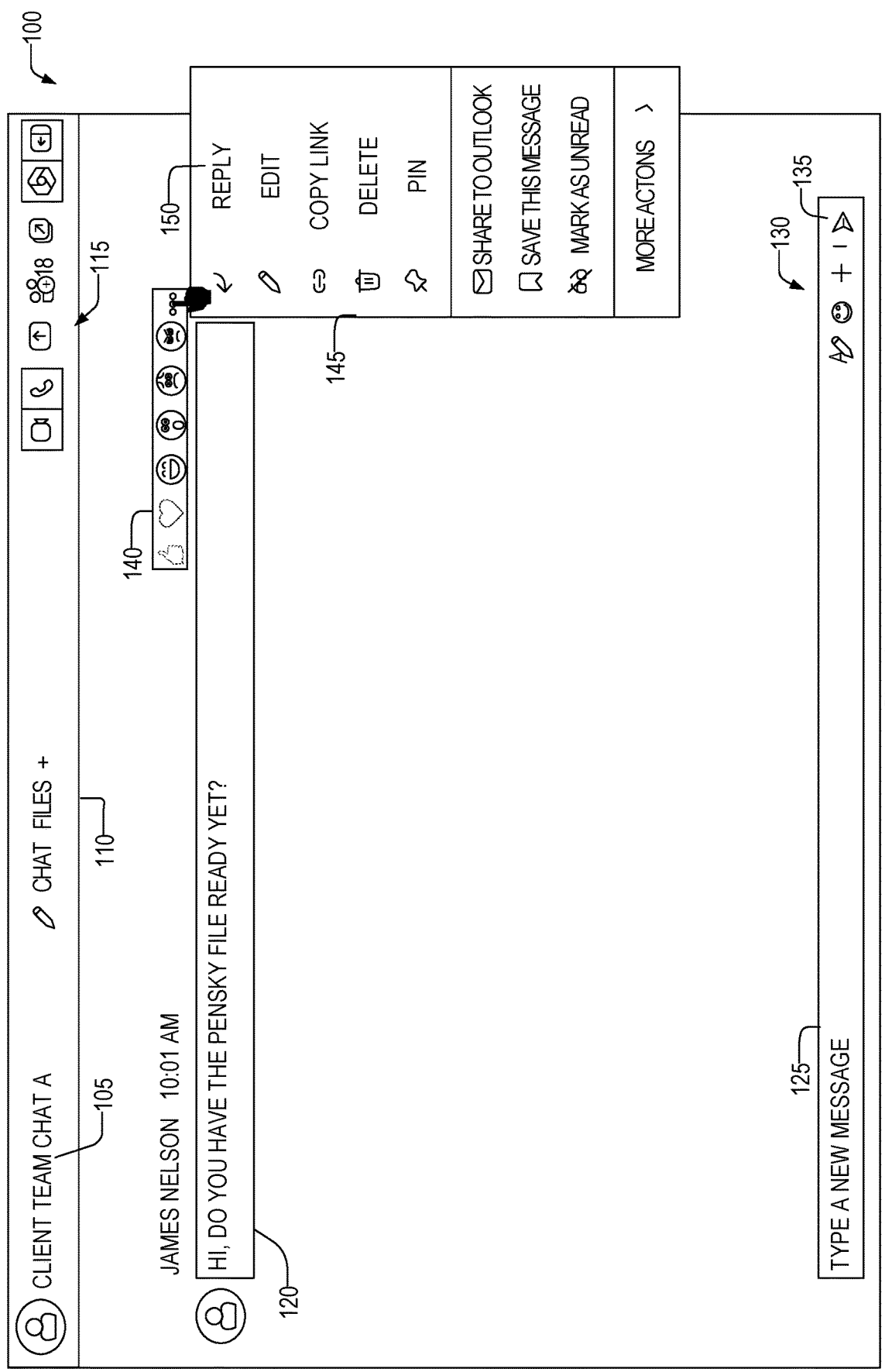
FIGS. 1-6 illustrate Graphical User Interfaces (GUIs) of a messaging application according to some examples of the present disclosure.

FIG. 1 illustrates a Graphical User Interface (GUI) 100 of a messaging application according to some examples of the present disclosure. The GUI illustrates a messaging thread with a title "Client Team Chat A" in a title area 105 of a title bar 110 of the messaging thread. Title bar 110 may include a number of controls 115, such as controls to launch a video call with thread members, an audio call with thread members, content sharing with thread members, adding additional thread members, a control to pop-out the messaging to an external interface and the like. A first message in the thread from James Nelson arrives at 10:01 AM and is displayed in a message display element 120. Message display element 120 may be a bubble, a box, or other UI element that demarcates the message from other messages in a message thread.

Message composition input element 125 allows users to enter and edit messages for posting into the currently displayed messaging thread where it would be displayed in a message display element. Posting a message in a message thread makes the message available to participants of the message thread. The message is made available by either sending it to the participants for display in their communication applications or by updating a data structure at a communication server which may then be propagated to the communication applications to display the message. As used herein, an input element, such as the message composition input element or a selectable draft reply message composition input element may encompass user interface components that allow users to create and/or edit a message by providing user input. Example input elements may include text boxes, dropdown menus, checkboxes, radio buttons, and the like.

Message sent by the user of the GUI 100 may be displayed on the GUI 100 of that user in a position to indicate that it was sent by the user. That is, a message sent by the user may be shown differently than messages from other users. For example, rather than being left-justified or aligned like messages sent from other users, the messages posted to the conversation by the user of GUI 100 may be right-justified or aligned in a fashion that visually represents a back-and-forth conversation. Message composition input element 125 may include a toolbar 130 with message formatting options, such as text formatting tools, emoji insertion options, content insertion options, and the like. Send button 135 posts the message to the conversation thread.

To reply to a message, a user may hover their cursor or otherwise select the message display element 120 to show a reaction toolbar 140 where users may leave a reaction such as a like, love, or other reaction. Reactions in a message thread are brief, expressive interactions where users use icons, emojis, or emoticons to convey their emotional responses or opinions to a message. Reactions may be shown as icons to other users above, below, or near the message. Reactions enable users to provide quick feedback or show their sentiments in a visually succinct manner. In addition, the reaction toolbar may include an ellipses, which when selected, displays another menu 145 with an option to reply 150. In other examples, the reply button may be on the reaction toolbar 140 itself. In still other examples, the reply button may be within the message display element 120 (e.g., at the right hand side).

Figure 2:
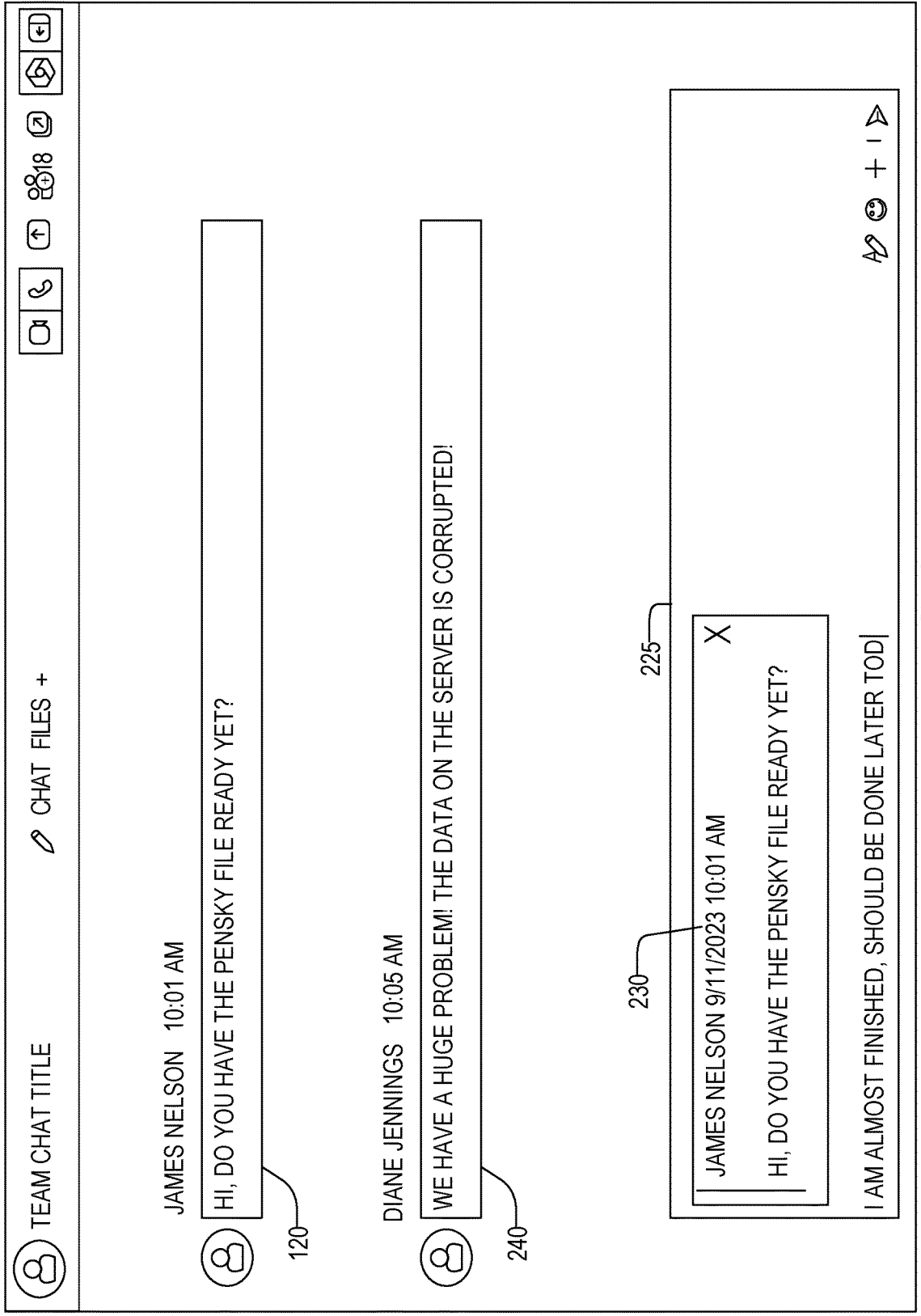

FIG. 2 illustrates a GUI 200 that is the GUI 100 of FIG. 1 after the selection of the option to reply is selected according to some examples of the present disclosure. A copy of the message from message display element 120 is placed in the message composition input element 225 inline to the reply. Upon posting the reply, the reply message entered into the message composition input element 225, along with the copy of the message from the message display element 120 may be posted at the end of the conversation thread as a new message.

Figure 3:
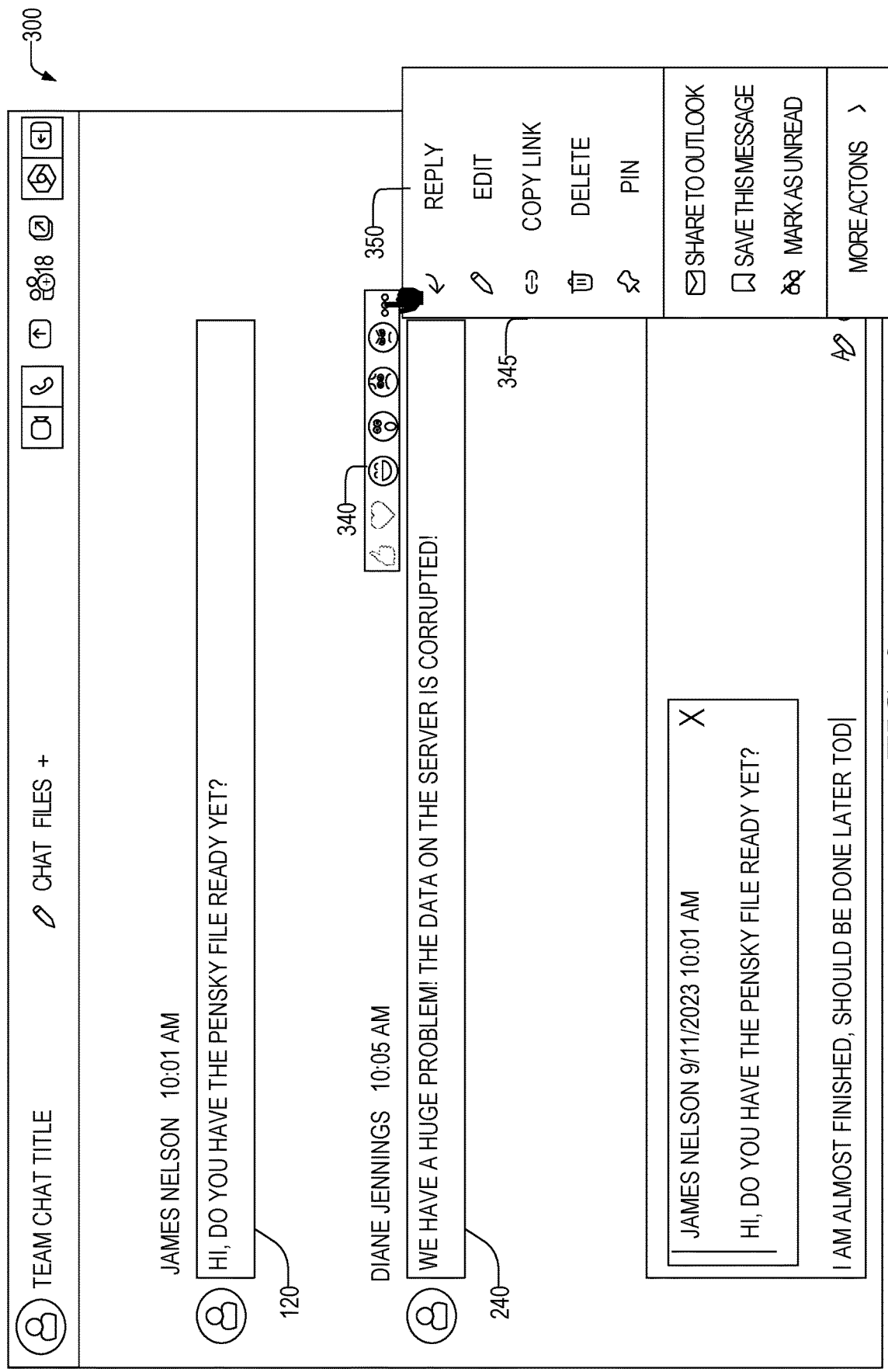
Figure 4:
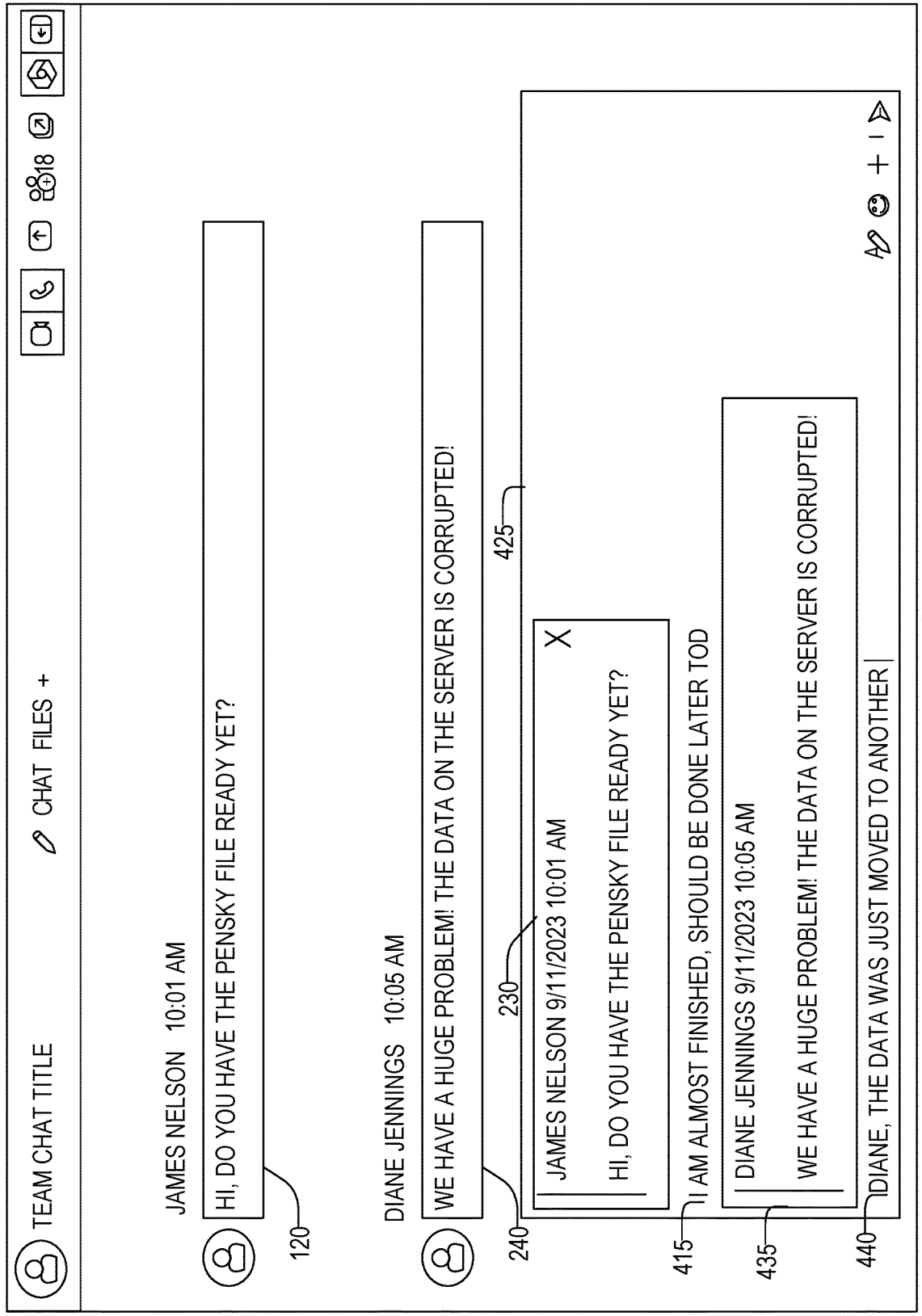

While a user is articulating a reply to a first message shown in message display element 120, other messages may be posted into the messaging thread. This is illustrated in FIG. 2 with the posting of a message from Diane Jennings as depicted in the message display element 240. The user may decide that it may be beneficial to reply to this message first, such as to correct a misconception with the third user's message before other users jump into the conversation. FIGS. 3 and 4 show GUIs 300 and 400 that illustrate what happens if the user, in the middle of formulating a first reply, such as a reply to the message shown in message display element 120, again engages the reaction toolbar 340, and selects the ellipses to bring up menu 345 and selects option 350 to reply while a reply is already in progress. FIG. 4 illustrates the message composition input element 425 with a copy of the first message 230, a draft reply 415, a copy of the second message 435, and a draft 440 of a reply to the second message. If the user posts the message, it is posted at the end of the messaging thread as shown in the message composition input element 425.

Another option for the above situation is to delete the first draft reply and then reply to the new message. This means that the first user may have to start over by re-drafting the message or else copy and paste the draft message into another application such as a notepad or word processing application and then copy and paste the draft back into the message send box.

Disclosed in some examples are methods, systems, machine-readable mediums that provide for multiple concurrent message input elements in a messaging application to allow for saved draft messages. The improved interfaces allow a user to compose separate, respective responses to multiple incoming messages of a same messaging thread. As noted, the current messaging user interface (UI) only allows users to compose a response to a single message of a same messaging thread. In the present disclosed interface, if during composition of a "reply" to message A, and a user decides to first reply to message B, the in-process reply message is saved in a separate selectable input element. The user may edit and send the reply to message A at a later time—e.g., once they are done replying to message B. In some examples, the separate selectable input element may be positioned in the thread in a manner to indicate that it is a draft reply message and to which message it is a reply.

Figure 5:
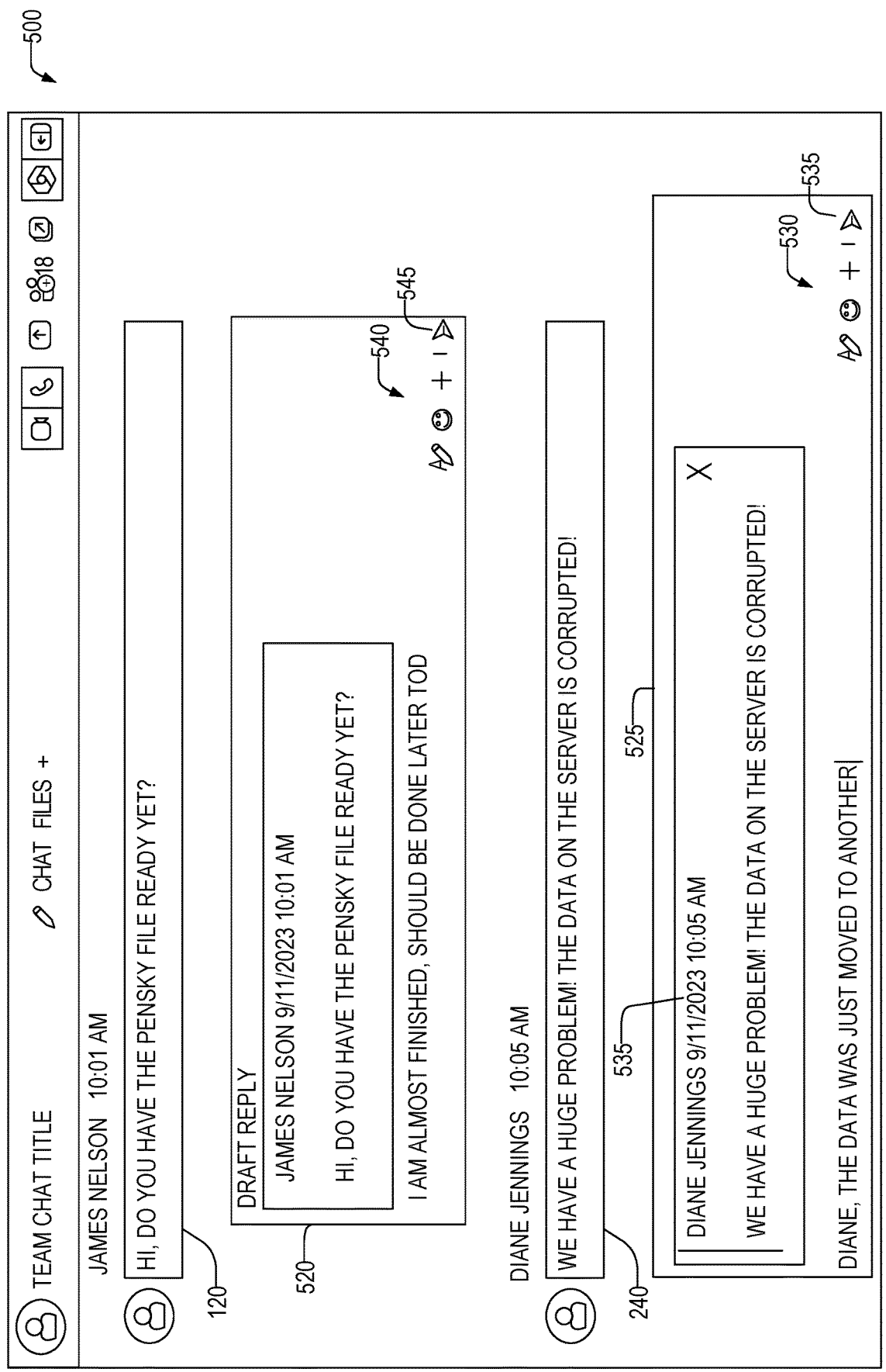

FIG. 5 illustrates an improved messaging GUI 500 according to some examples of the present disclosure. A user, having started a reply to message shown in message display element 120, as in FIG. 3, may then, prior to posting the reply, reply to another message, such as a message shown in message display element 240. Instead of having both messages inside a same message as in FIG. 4, the system recognizes that a draft of a pending message is ongoing when the system senses the reply to the second message and instead of concatenating both replies inside a same message, the system saves the draft of the pending message and then creates a new draft of the later, second reply message. The saved draft reply message may be displayed in a selectable draft reply message composition input element 520. The selectable draft reply message composition input element may include the same functionality as the message composition input element that may allow users to draft, edit, and format a response; attach media; attach emojis; and post messages. The selectable draft reply message composition input element 520 may be displayed in a fashion that indicates it is related to the message to which it is a reply—that is the message represented by message display element 120. In the example of FIG. 5, the selectable draft reply message composition input element 520 is put immediately below and offset of the original message in the message display element 120. Other example layouts may be utilized, for example, one or more icons may be appended to, or included in the message display element 120 that may be selected to show or hide the selectable draft reply message composition input element 520. For example, a bubble belown the message may indicate "1 pending draft reply" with an arrow that shows or hides the draft reply. Selectable draft reply message composition input element 520 may be selected by a user in which case the UI focus is directed toward the selectable draft reply message composition input element and entered text of the user is directed toward the draft reply message allowing a user to create and/or edit the reply message.

Selectable draft reply message composition input element 520 may include the toolbar 540 and the send button 545, which may be a same toolbar and send button functionality as provided in toolbar 530 and 535 of the message composition input element 525 (as described in FIG. 1). In some examples, the message composition input element 525 is still used for entering the reply messages as in FIG. 2, however, the selectable draft reply message composition input element: 520 stores uncompleted draft reply messages that are ongoing when the user enters a new reply. That is, the ongoing reply is moved from the message composition input element 525 to a selectable draft reply message composition input element 520 when the user replies to another message. In further examples, additional selectable draft reply message composition input elements may be created as the user selects additional messages to reply to before sending one of the previous replies. In some examples, an additional button may be added to the message composition input element 525 to save a message as a draft. For reply messages, the draft reply message composition input element 520 may store the draft. For regular draft messages that are not replies, a draft reply message composition input element may be utilized to save a draft message that is not a reply to a specific message, but simply a new message to the thread.

Users may switch between editing messages in either the message composition input element 525 and the various selectable draft reply message composition input elements by clicking on, tapping on, or otherwise selecting the desired composition input area. This allows users to switch back and forth between draft messages.

The present disclosure thus solves a technical problem whereby users wishing to reply to a later delivered message whilst replying to a previous message must utilize a separate application to temporarily store the first draft reply message. This usage wastes computing resources as the application utilizes memory and processing resources. This technical problem is solved with the technical solution of storing multiple reply messages that a user may come back to later. This has the technical effect of reducing the processor load and decreasing the amount of memory required by removing the necessity of another application to save the intermediate draft. In addition, it achieves the technical effect of improved user efficiency and usability and increased user interaction performance.

In other examples, rather than utilizing the message composition input element to reply to the message, and then generating a selectable draft reply message composition input element if another reply is started prior to posting the first reply, the system may utilize selectable draft reply message composition input elements directly. That is, a selectable draft reply message composition input element may be created upon replying to a message in the first instance and any reply message may be entered into selectable draft reply message composition input elements. The message composition input element may be limited to posting of new messages (not reply messages) in the thread.

Figure 6:
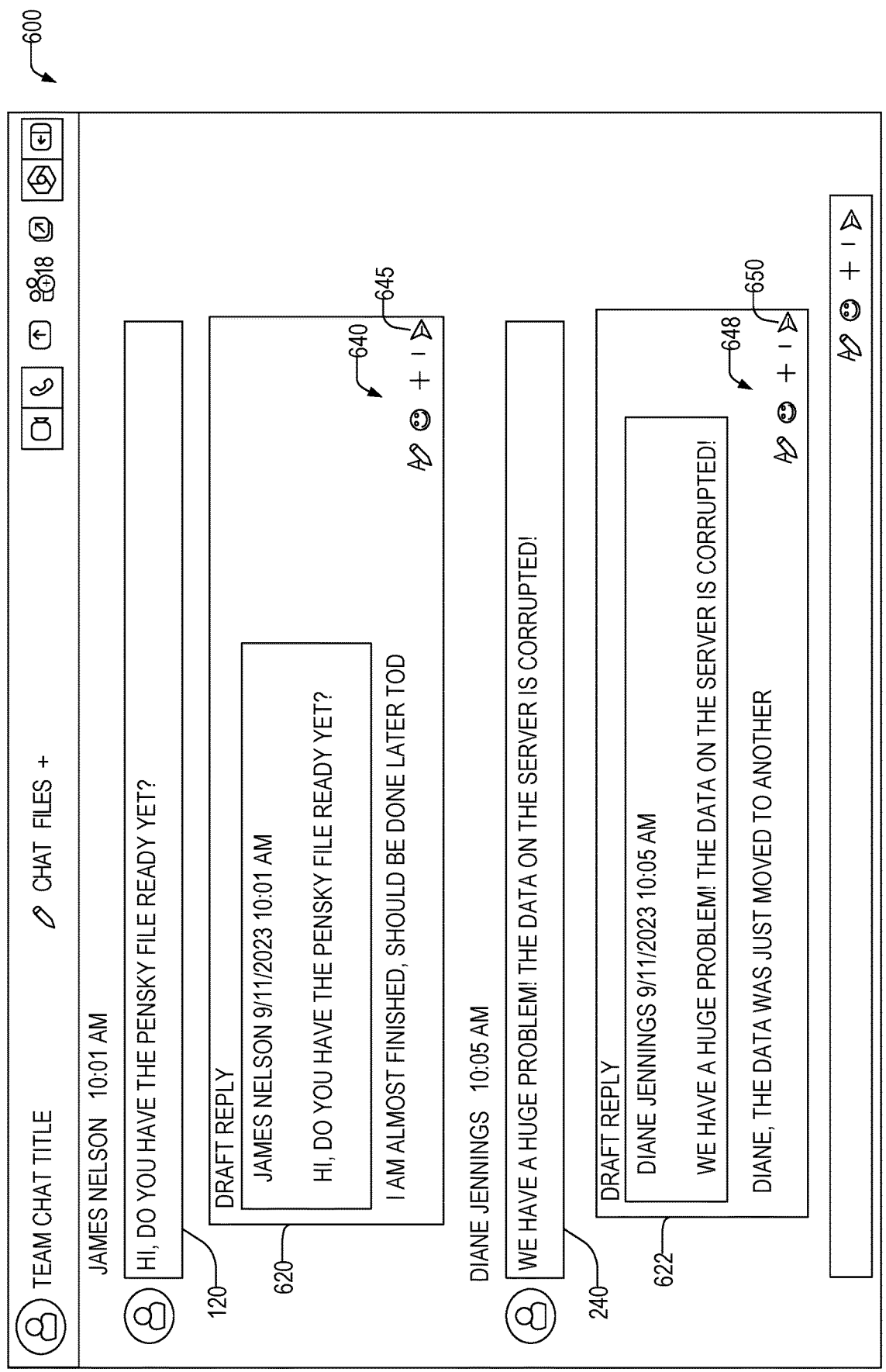

FIG. 6 shows an example GUI 600 where a user has started a first reply to a message shown in message display element 120. This reply is contained in a selectable draft reply message composition input element 620, which includes a copy of the message the user is replying to as well as a toolbar 640 for formatting the message, inserting emojis, and the like. In addition a post button 645 may post the reply message to the thread. In addition in FIG. 6, the user has additionally started a reply to a second message shown in message display element 240 and that reply is contained in a second selectable draft reply message composition input element 622. Second selectable draft reply message composition input element 622 may also include the toolbar 648, which is a same toolbar as 640, but only operating on the second draft reply. Similarly, post button 650 may be selectable to post the second reply message to the communication thread. Users may select the selectable draft reply message composition input element 620 to edit the draft reply to the message shown in message display element 120 and select the second selectable draft reply message composition input element 622 to edit the draft reply to the message shown in message display element 240. Users may go back and forth editing each message at their leisure by selecting each element.

As noted, the reply messages may be posted at the end of the communication thread. In other examples, the reply messages may be posted after the message that they are replying to. In these examples, the reply message may be indented from the message that they are replying to.

Figure 7:
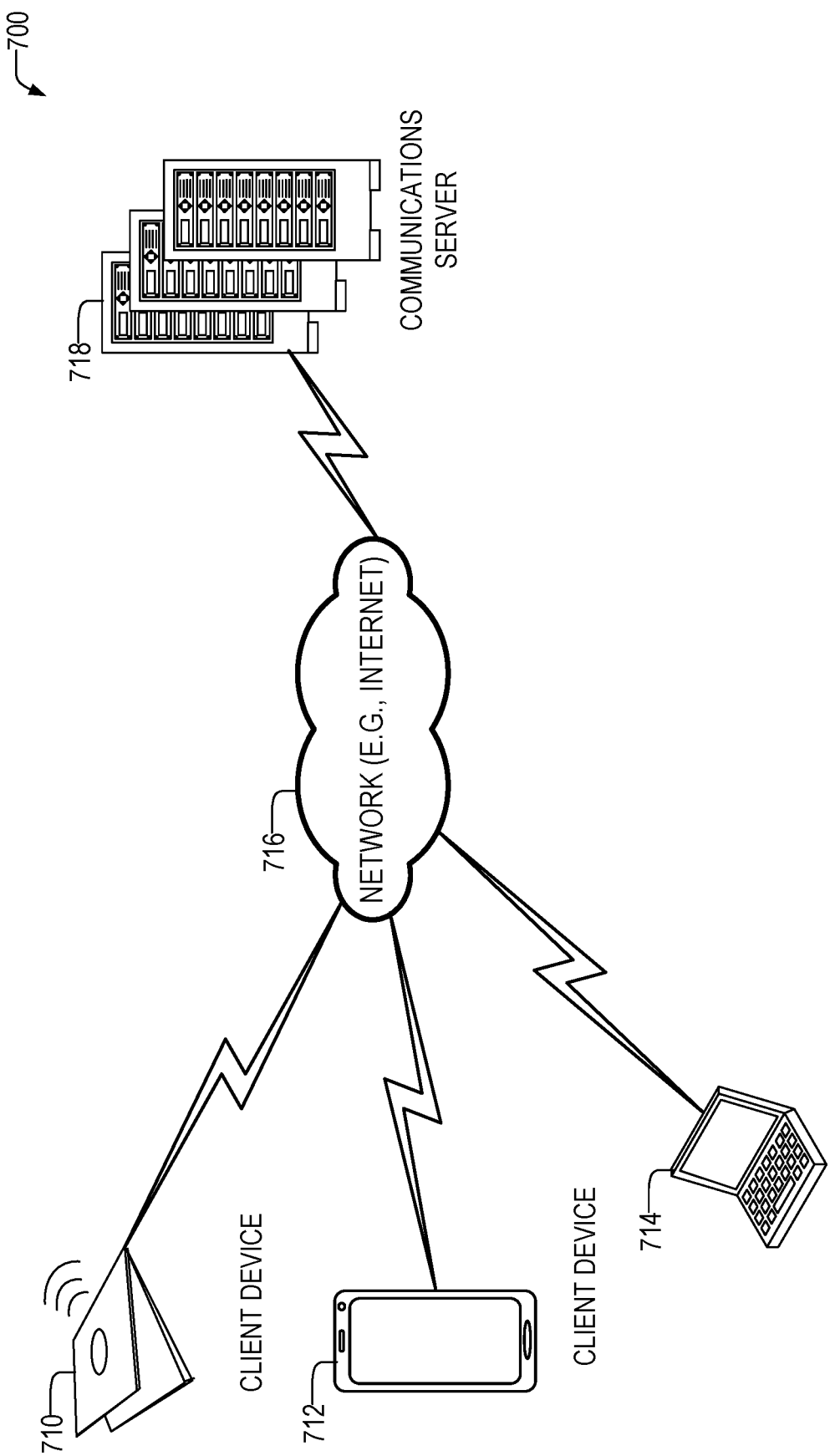
FIG. 7 illustrates a schematic of a communication system according to some examples of the present disclosure.

FIG. 7 illustrates a schematic 700 of a communication system according to some examples of the present disclosure. Client devices 710, 712, and 714 execute client communication applications that, along with a communication service application that executes on communication server 718 provides a communication service, such as a unified communication service, whereby client devices 710, 712, and 714 may communicate, over network 716, with one another and with other devices not shown in FIG. 7. Communications may include messaging communications in which text messages, files, videos, and other content may be shared. Such content may be posted as described with respect to the GUIs shown in FIGS. 1-6. In some examples, the communications service may be a unified communications service that also provides voice and/or video calling and online meetings. Network 716 may be or include a Local Area Network (LAN), Wide Area Network (WAN), the Internet, an Intranet, or the like.

Figure 8:
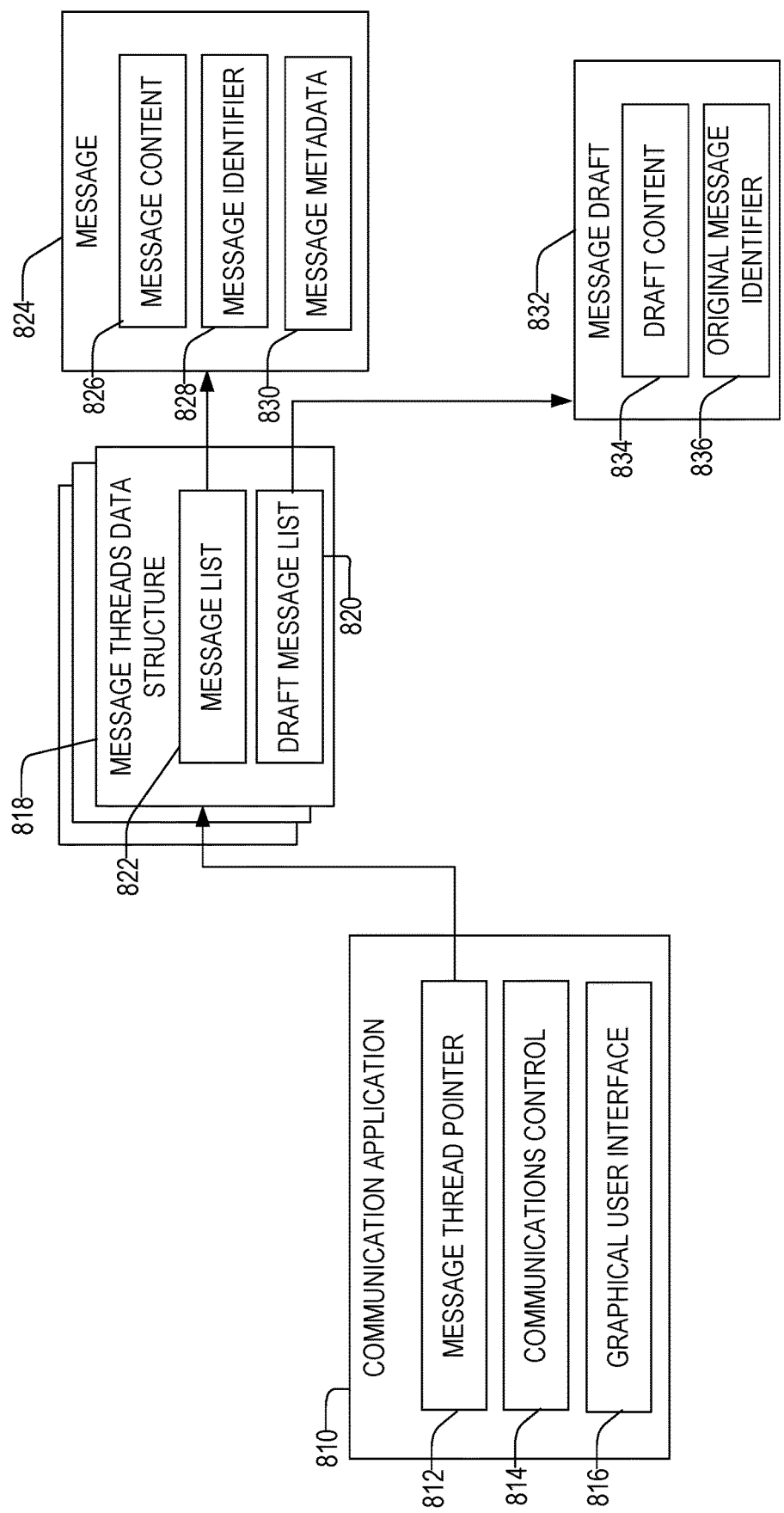
FIG. 8 illustrates an example communication application and data structures for one or more communication threads according to some examples of the present disclosure.

FIG. 8 illustrates an example communication application and data structures for one or more communication threads according to some examples of the present disclosure. Communication application 810 may include a variety of components, implementing a variety of functionality to provide network-based communication capability such as text messaging, file sharing, video calling, video communications, audio communications, and the like. Communication application 810 may provide user interfaces for message viewing and composition; provide for user authentication; notification management, and message storage. Communication application 810 may communicate with a messaging server, which may provide for message routing, message delivery, user management, message storage, encryption, and other functions. In some examples, the communication application includes a communication control component 814 which provides for sending and receiving communications, such as messages, files, video, audio, screensharing, and the like. For example, using one or more communication protocols such as Session Initiation Protocol, HyperText Transfer Protocol (HTTP), Real-Time Transport Protocol (RTP) and the like.

Communication application 810 may include a graphical user interface component 816, which may provide one or more GUIs that allow a user to interface with the communication application 810, including sending and receiving communications and displaying the communications. GUI component may implement one or more GUIs such as those shown in FIGS. 1-6.

The communications control component 814 may utilize one or more memory data structures in providing messaging communications. One such data structure may be a message thread pointer 812 that identifies a location of a plurality of data structures that store information on message threads of the user, such as message threads data structure 818. As used herein a pointer may identify the location of a data structure or other variable in volatile memory, non-volatile memory, a network location (e.g., such as a URL), and the like. In some examples, the message threads data structures may be arranged as a linked list, an array, or the like. In examples in which the data structures are arranged as linked lists, the various pointers of the list are not shown for clarity and ease of description. Each message threads data structure 818 may identify (e.g., contain, point to, or otherwise provide a means to locate) a message list 822 of one or more message data structures—one for each message in the thread, such as message data structure 824. Message data structure 824 may include message content 826, a message identifier 828, and message metadata 830. Message metadata 830 may include the sender, the time it was sent, reactions to the message entered by users, and the like. Message threads data structure 818 may also include a draft message list 820 which may be a list or other data structure with in-progress draft messages. The list may have zero or more message draft data structures. An example message draft data structure 832 is shown with draft content 834—which may include the content of the original message and an identifier 836 (e.g., message id) of the message that the draft is replying to. In some examples, although not shown, the message draft structure 832 may include metadata such as the sender, the time the draft was started, a time the draft was last edited, and the like. The message structures shown in FIG. 8 may be stored locally, and updated by the communications server using one or more commands, or may be stored in the communications server.

In some examples, when a reply message to an existing message is created, a message draft data structure 832 may be created. When a second reply to an existing message is created, another message draft data structure 832 is allocated. The first message draft data structure 832 is maintained and displayed by the GUI component 816. When a draft message is sent, a message data structure 824 may be allocated and filled in, with the draft content 834 being copied to the message content 826. A message identifier 828 may be allocated that uniquely identifies the new message. Message metadata 830 may also be determined and recorded. The message draft data structure 832 may then be deleted once the message draft is sent, or otherwise deleted (e.g., using a delete button or control on the UI).

Figure 9:
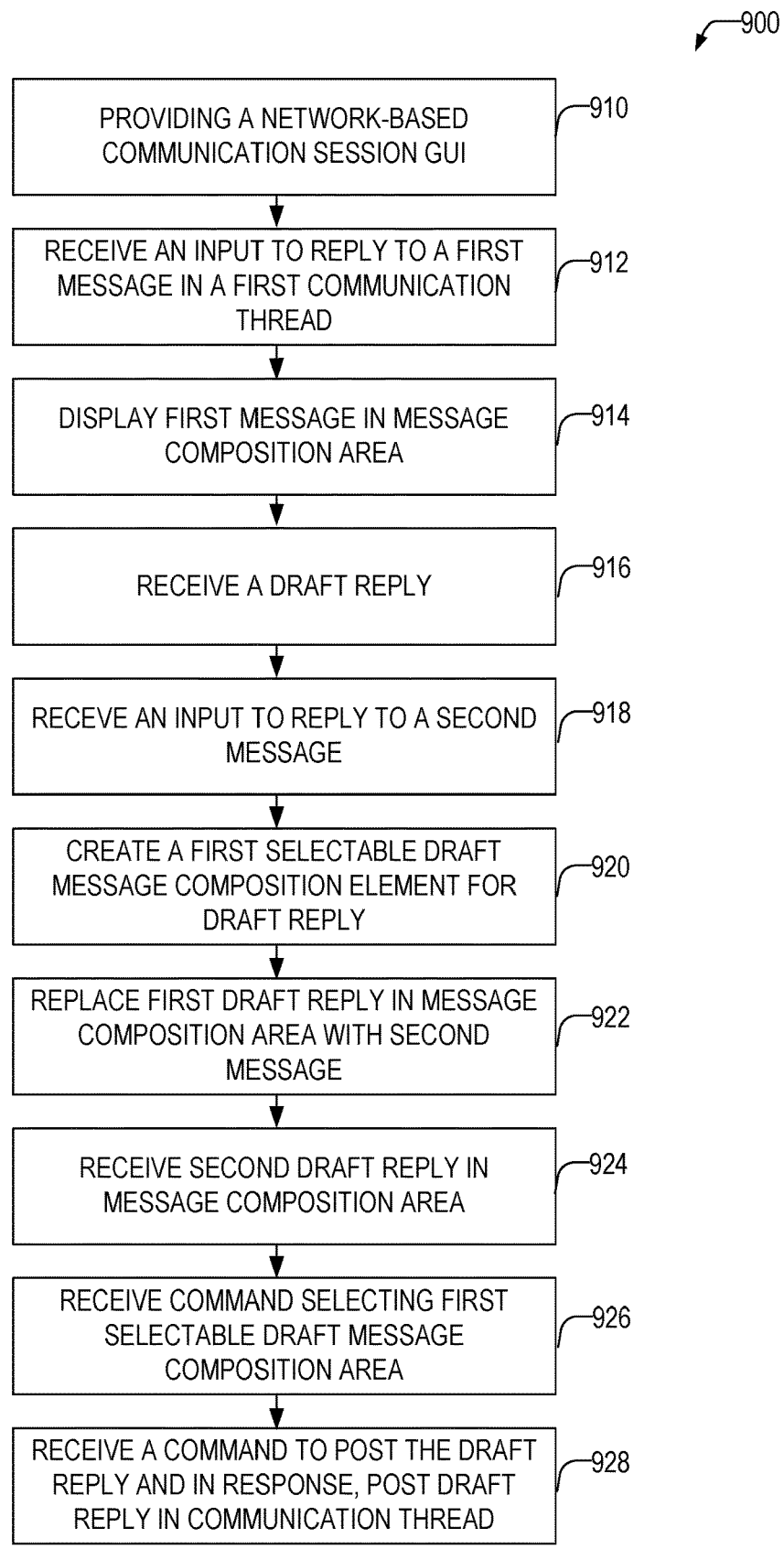
FIG. 9 illustrates a flowchart of a method of providing a messaging thread according to some examples of the present disclosure.

FIG. 9 illustrates a flowchart of a method 900 of providing a messaging thread according to some examples of the present disclosure. At 910, the system may provide a GUI of a network-based communication session, such as a messaging application. In some examples, the graphical user interface comprises a first message display element visually presenting a first message of a first communication thread and a message composition input element for entering and posting messages to the first communication thread. For example, message composition input element 125, 225, 425, 525; message display element 120, 240, selectable draft reply message composition input element 520, and 620.

At operation 912, the system may receive an input to reply to a first message in a first communication thread. For example, an input directed at the message display element, such as shown in FIG. 1. At operation 914, the system may display the first message in the message composition input element, such as shown in FIG. 2. In some examples the system may activate message entry in the message composition input element, such as by enabling input on the message composition input element such that text input is directed to the message composition input element.

At operation 916, the system may receive a draft reply message, such as a partial reply message, into the message composition input element. The draft reply may be entered using a keyboard, mouse, touchscreen or other input entry mechanism. At operation 918, the system may receive an input to reply to a second message of the first communication thread. For example, as shown in FIG. 3. In response to the input at operation 918, the operations of 920, 922 may be performed. At operation 920, the system creates, in the GUI, a first selectable draft message composition input element displaying a representation of the first message and the draft reply message, the first selectable draft message composition input element displayed at a location different than the message composition input element. In some examples the system creates a message draft data structure (e.g., message draft data structure 832) with the message contents of the message the user is replying to copied to the draft content. At operation 922, the system may replace the display of the representation of the first message and the draft reply message in the message composition input element with a representation of the second message and activate message entry in the message composition input element. Operations 920 and 922 are shown, for example, in FIG. 5.

At operation 924, the system may receive a second draft reply message entered into the message composition input element (e.g., using a keyboard, mouse, touchscreen, or the like), the first selectable draft message composition input element may still be displayed in the GUI as the second draft reply message is entered. At operation 926, the system may receive a command selecting the first selectable draft message composition input element, and in response, activating message entry in the first selectable draft message composition input element. In some examples, the draft entered at operation 924 may be maintained in the message composition input element. For example, the activation of the message entry may be an enabling of input on the draft message composition input element such that text input is directed to the draft message composition input element. For example, enabling of input on element 520 of FIG. 5. At operation 928, the system may receive a command to post the draft reply message and in response, posting the draft reply message in the first communication thread as a reply message to the first message.

FIG. 9 may be performed by a client communication application, a communication service application on a server of a communication service, or some operations may be performed by the client communication application and some operations may be performed by a communication service application on a server of a communication service.

Figure 10:
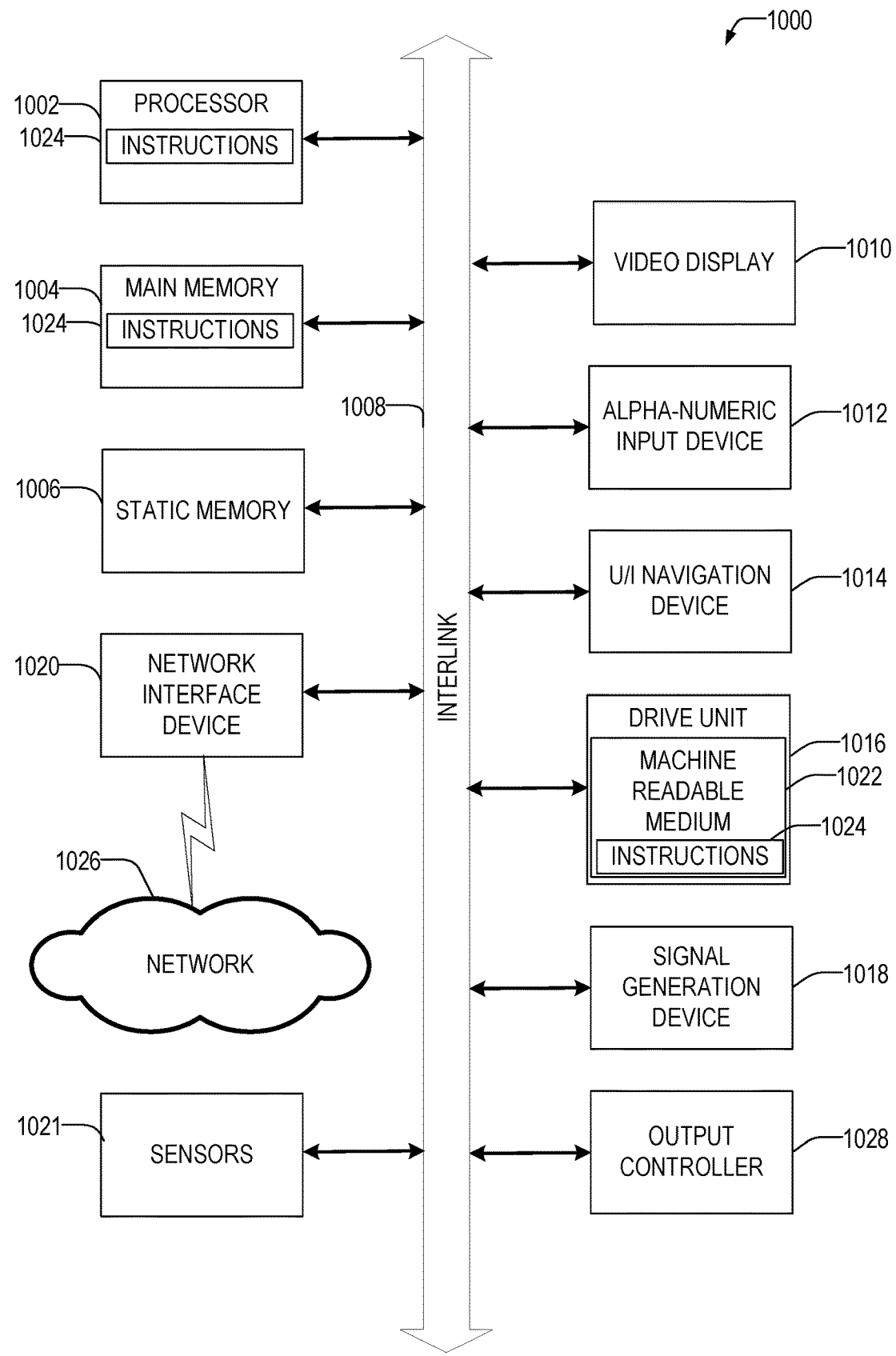
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may be performed. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be in the form of a desktop, a server, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 1000 may provide the GUIs of FIGS. 1-6, be or implement the client devices 710, 712, 714; communications server 718; implement or store the data structures of FIG. 8; and the methods of FIG. 9.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 1000 may include one or more hardware processors, such as processor 1002. Processor 1002 may be a central processing unit (CPU), a graphics processing unit (GPU), a hardware processor core, or any combination thereof. Machine 1000 may include a main memory 1004 and a static memory 1006, some or all of which may communicate with each other via an interlink (e.g., bus) 1008. Examples of main memory 1004 may include Synchronous Dynamic Random-Access Memory (SDRAM), such as Double Data Rate memory, such as DDR4 or DDR5. Interlink 1008 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The Machine 1000 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

OTHER NOTES AND EXAMPLES

Example 1 is a method for providing a network-based communication system, the method comprising: providing a graphical user interface (GUI) for the network-based communication system, the graphical user interface comprising a first message display element visually presenting a first message of a first communication thread and a message composition element for entering and posting messages to the first communication thread; receiving an input to reply to a first message of the first communication thread; responsive to receiving the input, displaying a representation of the first message in the message composition element and activating message entry in the message composition element; receiving a draft reply message entered into the message composition element; prior to receiving an input to post the draft reply message to the first communication thread, receiving an input to reply to a second message of the first communication thread; responsive to receiving an input to reply to the second message of the first communication thread: creating, in the GUI, a first selectable draft message composition element displaying a representation of the first message and the draft reply message, the first selectable draft message composition element displayed at a location different than the message composition element and being selectable to direct entered text to edit the draft reply message; and replacing the display of the representation of the first message and the draft reply message in the message composition element with a representation of the second message and activating message entry in the message composition element to direct entered text to provide a second draft reply message; receiving the second draft reply message entered into the message composition element, the first selectable draft message composition element still displayed in the GUI as the second draft reply message is entered; receiving a command selecting the first selectable draft message composition element, and in response, activating message entry in the first selectable draft message composition element; and receiving a command to post the draft reply message and in response, posting the draft reply message in the first communication thread as a reply message to the first message.

In Example 2, the subject matter of Example 1 includes, wherein receiving the input to reply to the first message of the first communication thread comprises receiving the input from a context menu adjacent to the first message display element.

In Example 3, the subject matter of Examples 1-2 includes, prior to receiving the command selecting the first selectable draft message composition element, receiving a command to post the second draft reply message; and responsive to receiving the command to post the second draft reply message, posting a second reply message to the first communication thread.

In Example 4, the subject matter of Examples 1-3 includes, wherein the first selectable draft message composition element includes a delete element; and wherein the method further comprises receiving an input to the delete element and in response, removing the first selectable draft message composition element, including deleting the draft reply message.

In Example 5, the subject matter of Examples 1-4 includes, prior to receiving the command selecting the first selectable draft message composition element, receiving a command to post the second draft reply message; and responsive to receiving the command to post the second draft reply message, providing a notification that the first selectable draft message composition element is still active.

In Example 6, the subject matter of Examples 1-5 includes, wherein receiving the command to post the draft reply message comprises receiving a selection of a post element in the first selectable draft message composition element.

In Example 7, the subject matter of Examples 1-6 includes, wherein the first selectable draft message composition element is placed below and indented from the first message display element.

Example 8 is a computing device for providing a network-based communication system, the computing device comprising: providing a graphical user interface (GUI) for the network-based communication system, the graphical user interface comprising a first message display element visually presenting a first message of a first communication thread and a message composition element for entering and posting messages to the first communication thread; receiving an input to reply to a first message of the first communication thread; responsive to receiving the input, displaying a representation of the first message in the message composition element and activating message entry in the message composition element; receiving a draft reply message entered into the message composition element; prior to receiving an input to post the draft reply message to the first communication thread, receiving an input to reply to a second message of the first communication thread; responsive to receiving an input to reply to the second message of the first communication thread: creating, in the GUI, a first selectable draft message composition element displaying a representation of the first message and the draft reply message, the first selectable draft message composition element displayed at a location different than the message composition element and being selectable to direct entered text to edit the draft reply message; and replacing the display of the representation of the first message and the draft reply message in the message composition element with a representation of the second message and activating message entry in the message composition element to direct entered text to provide a second draft reply message; receiving the second draft reply message entered into the message composition element, the first selectable draft message composition element still displayed in the GUI as the second draft reply message is entered; receiving a command selecting the first selectable draft message composition element, and in response, activating message entry in the first selectable draft message composition element; and receiving a command to post the draft reply message and in response, posting the draft reply message in the first communication thread as a reply message to the first message.

In Example 9, the subject matter of Example 8 includes, wherein the operations of receiving the input to reply to the first message of the first communication thread comprises receiving the input from a context menu adjacent to the first message display element.

In Example 10, the subject matter of Examples 8-9 includes, wherein the operations further comprise: prior to receiving the command selecting the first selectable draft message composition element, receiving a command to post the second draft reply message; and responsive to receiving the command to post the second draft reply message, posting a second reply message to the first communication thread.

In Example 11, the subject matter of Examples 8-10 includes, wherein the first selectable draft message composition element includes a delete element; and wherein the operations further comprise receiving an input to the delete element and in response, removing the first selectable draft message composition element, including deleting the draft reply message.

In Example 12, the subject matter of Examples 8-11 includes, wherein the operations further comprise: prior to receiving the command selecting the first selectable draft message composition element, receiving a command to post the second draft reply message; and responsive to receiving the command to post the second draft reply message, providing a notification that the first selectable draft message composition element is still active.

In Example 13, the subject matter of Examples 8-12 includes, wherein the operations of receiving the command to post the draft reply message comprises receiving a selection of a post element in the first selectable draft message composition element.

In Example 14, the subject matter of Examples 8-13 includes, wherein the first selectable draft message composition element is placed below and indented from the first message display element.

Example 15 is a machine-readable storage medium, storing instructions for providing a network-based communication system, the instructions, when executed by a computing device, cause the computing device to perform operations comprising: providing a graphical user interface (GUI) for the network-based communication system, the graphical user interface comprising a first message display element visually presenting a first message of a first communication thread and a message composition element for entering and posting messages to the first communication thread; receiving an input to reply to a first message of the first communication thread; responsive to receiving the input, displaying a representation of the first message in the message composition element and activating message entry in the message composition element; receiving a draft reply message entered into the message composition element; prior to receiving an input to post the draft reply message to the first communication thread, receiving an input to reply to a second message of the first communication thread; responsive to receiving an input to reply to the second message of the first communication thread: creating, in the GUI, a first selectable draft message composition element displaying a representation of the first message and the draft reply message, the first selectable draft message composition element displayed at a location different than the message composition element and being selectable to direct entered text to edit the draft reply message; and replacing the display of the representation of the first message and the draft reply message in the message composition element with a representation of the second message and activating message entry in the message composition element to direct entered text to provide a second draft reply message; receiving the second draft reply message entered into the message composition element, the first selectable draft message composition element still displayed in the GUI as the second draft reply message is entered; receiving a command selecting the first selectable draft message composition element, and in response, activating message entry in the first selectable draft message composition element; and receiving a command to post the draft reply message and in response, posting the draft reply message in the first communication thread as a reply message to the first message.

In Example 16, the subject matter of Example 15 includes, wherein the operations of receiving the input to reply to the first message of the first communication thread comprises receiving the input from a context menu adjacent to the first message display element.

In Example 17, the subject matter of Examples 15-16 includes, wherein the operations further comprise: prior to receiving the command selecting the first selectable draft message composition element, receiving a command to post the second draft reply message; and responsive to receiving the command to post the second draft reply message, posting a second reply message to the first communication thread.

In Example 18, the subject matter of Examples 15-17 includes, wherein the first selectable draft message composition element includes a delete element; and wherein the operations further comprise receiving an input to the delete element and in response, removing the first selectable draft message composition element, including deleting the draft reply message.

In Example 19, the subject matter of Examples 15-18 includes, wherein the operations further comprise: prior to receiving the command selecting the first selectable draft message composition element, receiving a command to post the second draft reply message; and responsive to receiving the command to post the second draft reply message, providing a notification that the first selectable draft message composition element is still active.

In Example 20, the subject matter of Examples 15-19 includes, wherein the operations of receiving the command to post the draft reply message comprises receiving a selection of a post element in the first selectable draft message composition element.

In Example 21, the subject matter of Examples 15-20 includes, wherein the first selectable draft message composition element is placed below and indented from the first message display element.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method for providing a network-based communication system, the method comprising:
providing a graphical user interface (GUI) for the network-based communication system, the GUI comprising a first message display element visually presenting a first message of a first communication thread and a message composition element for entering and posting messages to the first communication thread, the message composition element including a first send button;
receiving an input selecting an option to reply to the first message of the first communication thread;
responsive to receiving the input selecting the option to reply to the first message, displaying a copy of the first message in the message composition element and activating message entry in the message composition element;
receiving text input for a draft reply message entered into the message composition element;
displaying, in the GUI, a second message display element visually presenting a received second message posted in the first communication thread;
prior to receiving an input to post the draft reply message to the first communication thread, receiving an input selecting an option to reply to the second message;
responsive to receiving the input selecting the option to reply to the second message:
creating, in the GUI, a first selectable draft message composition element displaying the copy of the first message, the draft reply message, a second send button, the first selectable draft message composition element displayed at a location in the GIU different than the message composition element and being selectable to directly edit the text of the draft reply message; and replacing the copy of the first message and the draft reply message in the message composition element with a copy of the second message and activating message entry in the message composition element to directly entered text to provide a second draft reply message;

receiving text input for the second draft reply message entered into the message composition element, the first selectable draft message composition element, the first message display element, and the second message display element still displayed in the GUI as the text input for the second draft reply message is entered;

receiving a command selecting the first selectable draft message composition element, and in response, activating message entry in the first selectable draft message composition element; and receiving a command to post the draft reply message using the second send button and, in response, posting the draft reply message in the first communication thread indicated as a reply message to the first message.

2. The method of claim 1, wherein receiving the input selecting the option to reply to the first message of the first communication thread comprises receiving the input selecting the option to reply to the first message from a context menu adjacent to the first message display element.

3. The method of claim 1, further comprising:
prior to receiving the command selecting the first selectable draft message composition element, receiving a command to post the second draft reply message; and
responsive to receiving the command to post the second draft reply message, posting a second reply message to the first communication thread.

4. The method of claim 1, wherein the first selectable draft message composition element includes a delete element; and wherein the method further comprises receiving an input to the delete element and in response, removing the first selectable draft message composition element, including deleting the draft reply message.

5. The method of claim 1, further comprising:
prior to receiving the command selecting the first selectable draft message composition element, receiving a command to post the second draft reply message; and
responsive to receiving the command to post the second draft reply message, providing a notification that the first selectable draft message composition element is still active.

6. The method of claim 1, wherein receiving the command to post the draft reply message comprises receiving a selection of a post element in the first selectable draft message composition element.

7. The method of claim 1, wherein the first selectable draft message composition element is placed below and indented from the first message display element.

8. A computing device for providing a network-based communication system, the computing device comprising:
a processor;
a memory, storing instructions, which when executed by the processor, cause the processor to perform operations comprising:
providing a graphical user interface (GUI) for the network-based communication system, the GUI comprising a first message display element visually presenting a first message of a first communication thread and a message composition element for entering and posting messages to the first communication thread, the message composition element including a first send button;

receiving an input selecting an option to reply to the first message of the first communication thread;

responsive to receiving the input selecting the option to reply to the first message, displaying a copy of the first message in the message composition element and activating message entry in the message composition element;

receiving text input for a draft reply message entered into the message composition element;

displaying, in the GUI, a second message display element visually presenting a received second message posted in the first communication thread;

prior to receiving an input to post the draft reply message to the first communication thread, receiving an input selecting an option to reply to the second message;

responsive to receiving the input selecting the option to reply to the second message:
creating, in the GUI, a first selectable draft message composition element displaying the copy of the first message, draft reply message, and a second send button, the first selectable draft message composition element displayed at a location in the GUI different than the message composition element and being selectable to directly edit the text of the draft reply message; and
replacing the copy of the first message and the draft reply message in the message composition element with a copy of the second message and activating message entry in the message composition element to directly enter text to provide a second draft reply message;

receiving text input for the second draft reply message entered into the message composition element, wherein the first selectable draft message composition element, the first message display element, and the second message display element are still displayed in the GUI as the text input for the second draft reply message is entered;

receiving a command selecting the first selectable draft message composition element, and in response, activating message entry in the first selectable draft message composition element; and receiving a command to post the draft reply message using the second sent button and, in response, posting the draft reply message in the first communication thread indicated as a reply message to the first message.

9. The computing device of claim 8, wherein the operations of receiving the input selecting the option to reply to the first message of the first communication thread comprises receiving the input selecting the option to reply to the first message from a context menu adjacent to the first message display element.

10. The computing device of claim 8, wherein the operations further comprise:
prior to receiving the command selecting the first selectable draft message composition element, receiving a command to post the second draft reply message; and
responsive to receiving the command to post the second draft reply message, posting a second reply message to the first communication thread.

11. The computing device of claim 8, wherein the first selectable draft message composition element includes a delete element; and wherein the operations further comprise receiving an input to the delete element and in response, removing the first selectable draft message composition element, including deleting the draft reply message.

12. The computing device of claim 8, wherein the operations further comprise:
   prior to receiving the command selecting the first selectable draft message composition element, receiving a command to post the second draft reply message; and
   responsive to receiving the command to post the second draft reply message, providing a notification that the first selectable draft message composition element is still active.

13. The computing device of claim 8, wherein the operations of receiving the command to post the draft reply message comprises receiving a selection of a post element in the first selectable draft message composition element.

14. The computing device of claim 8, wherein the first selectable draft message composition element is placed below and indented from the first message display element.

15. A machine-readable storage device, storing instructions for providing a network-based communication system, the instructions, when executed by a computing device, cause the computing device to perform operations comprising:
   providing a graphical user interface (GUI) for the network-based communication system, the GUI comprising a first message display element visually presenting a first message of a first communication thread and a message composition element for entering and posting messages to the first communication thread, the message composition element including a first send button;
   receiving an input selecting an option to reply to the first message of the first communication thread;
   responsive to receiving the input selecting the option to reply to the first message, displaying a copy of the first message in the message composition element and activating message entry in the message composition element;
   receiving text input for a draft reply message entered into the message composition element;
   displaying, in the GUI, a second message display element visually presenting a received second message posted in the first communication thread;
   prior to receiving an input to post the draft reply message to the first communication thread, receiving an input selecting an option to reply to the second message;
   responsive to receiving the input selecting the option to reply to the second message:
      creating, in the GUI, a first selectable draft message composition element displaying the copy of the first message, the draft reply message, and a second send button, the first selectable draft message composition element displayed at a location in the GUI different than the message composition element and being selectable to directly edit the text of the draft reply message; and
      replacing the copy of the first message and the draft reply message in the message composition element with a copy of the second message and activating message entry in the message composition element to directly enter text to provide a second draft reply message;
   receiving text input for the second draft reply message entered into the message composition element, wherein the first selectable draft message composition element, the first message display element, and the second message display element are still displayed in the GUI as the text input for the second draft reply message is entered;
   receiving a command selecting the first selectable draft message composition element, and in response, activating message entry in the first selectable draft message composition element; and
   receiving a command to post the draft reply message using the second send button and, in response, posting the draft reply message in the first communication thread indicated as a reply message to the first message.

16. The machine-readable storage device of claim 15, wherein the operations of receiving the input selecting the option to reply to the first message of the first communication thread comprises receiving the input selecting the option to reply to the first message from a context menu adjacent to the first message display element.

17. The machine-readable storage device of claim 15, wherein the operations further comprise:
   prior to receiving the command selecting the first selectable draft message composition element, receiving a command to post the second draft reply message; and
   responsive to receiving the command to post the second draft reply message, posting a second reply message to the first communication thread.

18. The machine-readable storage device of claim 15, wherein the first selectable draft message composition element includes a delete element; and wherein the operations further comprise receiving an input to the delete element and in response, removing the first selectable draft message composition element, including deleting the draft reply message.

19. The machine-readable storage device of claim 15, wherein the operations further comprise:
   prior to receiving the command selecting the first selectable draft message composition element, receiving a command to post the second draft reply message; and
   responsive to receiving the command to post the second draft reply message, providing a notification that the first selectable draft message composition element is still active.

20. The machine-readable storage device of claim 15, wherein the operations of receiving the command to post the draft reply message comprises receiving a selection of a post element in the first selectable draft message composition element.

* * * * *